Patented Aug. 4, 1936

2,049,476

UNITED STATES PATENT OFFICE 2,049,476

PROCESS FOR MAKING DETERGENT

Axel Leonard Sodergreen, Malverne, N. Y., assignor to Herbert D. Pease, New York, N. Y.

No Drawing. Application September 12, 1933, Serial No. 689,077

3 Claims. (Cl. 87—16)

This invention relates to the process of making detergents and/or soaps by means of causticizing depolymerized cereal and/or other vegetable proteins and hydrolyzed starches while under heat and pressure, and at the same time saponifying the fats and/or fatty acids contained in the cereal or other vegetable products with sodium or potassium hydroxide; vacuumizing the resultant product and neutralizing any excess caustic alkali with carbon dioxide or any other neutralizing gas, forming a product free of caustic alkalinity and containing an alkali salt intimately bound into the detergent material.

Heretofore detergent compounds have been made from vegetable products such as cereals or cereals and fatty acids by causticizing the protein and starch and saponifying the fatty acids. These substances have been treated individually or in combination with a strong caustic solution, in which the causticity decreased by reason of the prompt chemical reaction at the start with consequential weakening of the caustic solution thus extending the time and increasing the temperatures required for the saponification and alkalization of the component factors in the cereal or other vegetable basic stock, forming a detergent of the sodium or potassium salts of proteins and starches and/or soap.

In this improved process use is made of cereals and/or other vegetable materials or products containing quantities of oil, protein and starch in which depolymerization of the proteins and hydrolysis of the starches is accomplished by generated heat, under pressure, altering the molecular structure in such a manner that rapid combination with alkali is possible. The advantages of this process are, (1) that the alkali is present during the process of de-polymerization and hydrolization but does not act until the physical alteration of the cereal cells have released the imbedded moisture sufficiently to dissolve the alkali, forming intimate contact with the nascent caustic solution made by the progressively released moisture from the cereal or other vegetable basic stock suitable for such detergents. (2) That in addition to the alkali-fixation of the de-polymerized protein and hydrolyzed starch the fats and/or fatty acids, contained in the cereal, are saponified by the dissolved caustic alkali forming substantially, in combination, alkalized protein and/or its degradation products, alkalized starch, and soap. (3) That at the end of this heating and alkalizing process the liberated ammoniacal gases are allowed to escape or are drawn out by means of vacuum, and the pressure regained by admitting a neutralizing gas; forming a product entirely void of free caustic alkali, containing in substance alkalized-protein, and/or degradation products of the same, alkalized starch, soap, and non-caustic alkali intimately mixed.

In use in water solutions the de-polymerized and alkalized proteins, while active as colloids, act in the manner of buffers or regulators, prolonging the active hydrolysis by water, thus reducing the violent chemical action and allowing continued alkali liberation as required by dilution. The compounds of the hydrolyzed and alkalized starches and alkali-fatty-acids dissolving in water, hydrolize and liberate free sodium hydroxide which combines with the grease and dirt, rapidly exhausting its detergent power, but the long continued hydrolysis of the alkalized proteins supplies the additional alkali necessary for loosening the dirt and grease as well as furnish active surface colloids which aid the penetrability of the alkali. The alkalized-protein while possessing exceptional detergent powers, is free rinsing because of the active surface colloids which float off the liberated and emulsified grease and dirt.

This process may be more clearly understood by the following illustration: The cereal (say 100 pounds of corn flour) is mixed in a steam-jacketed mixer or kneading machine with 40 pounds of water and heated until a slight darkening of the color of the flour takes place. During this period the cereal material is softened by action of the water and heat, and de-polymerization of the protein and hydrolysis of the starch takes place. This process can be expedited by closing the chamber of the mixer and building up an internal pressure of not more than 15 pounds gauge, or 120° centigrade. To this product is added 12½ pounds of pulverized anhydrous caustic soda and the internal pressure again allowed to build up to not above 15 pounds gauge. The caustic gradually dissolves in the liberated water vapor of the mass, and in concentrated form acts on the altered molecular structure of the proteins and starches to form alkalized protein and alkalized starch and on the contained fats and/or fatty acids to form soap. About 30 minutes is required for the complete alkalization of the material. The pressure is then released allowing the liberated ammoniacal and other gases to escape and a vacuum of 15 to 20 inches is drawn on the chamber containing the mass. The vacuum is then displaced by carbon-dioxide gas up to a pressure of 10 pounds gauge which is rapidly absorbed by the strongly causticized mass. This procedure produces a detergent of intimately mixed alkalized protein and/or degradation products of the same, alkalized starch, soap and alkali carbonates, free of caustic alkali.

By slight modification the caustic may be added immediately after the water is mixed into the cereal, the chamber closed and the internal pressure built up by reason of heat to not over 15 pounds gauge, continuing the process in much the same manner as described above.

By another modification a product containing added sodium carbonate, sodium silicate, sodium phosphate, or modified soda can be made. At the end of the neutralizing period any one or combination of the above alkalies can be added to the plastic mass. The amount of added alkali is governed by the use that the detergent will be put to.

By still another modification any specific soap can be added to the hot plastic mass after the neutralization period. The heat at this time is sufficient to melt the soap so that a true "crutching" and intimate mixing can be had.

By still another method the product can be altered to conform to molding, framing, or grinding by subsequent treatment after the neutralizing period.

This invention is not limited to any specific cereal or meal, but may use any basic vegetable compound suitable for detergents. Nor is there any limitation in the order of mixing the ingredients or the proportions of the different ingredients or the chemical agents used.

I claim:

1. A process for making a detergent from a cereal consisting in de-polymerizing the protein and hydrolyzing the starch by subjecting same to heat in the presence of moisture; alkalizing the de-polymerized protein and hydrolyzed starch and saponifying the imbedded fats and fatty-acids if present by intimate contact with nascent caustic solution made by the progressively released moisture from the cereal; maintaining sufficient heat under pressure to produce proper liberation of water vapor, thus securing thorough alkalization; and finally exhausting the liberated gases and neutralizing any free caustic alkali by means of carbon dioxide under pressure.

2. A process for making a detergent from a cereal consisting in de-polymerizing the protein and hydrolyzing the starch by subjecting same to heat in the presence of moisture, alkalizing the molecular changed mass and saponifying the imbedded fats and fatty-acids if present with nascent caustic solution made by the progressively liberated water vapor, and exhausting the liberated gases and neutralizing any free caustic alkali by means of carbon dioxide.

3. The process of making a detergent from a cereal consisting in heating the same in the presence of added moisture until darkening takes place, adding caustic alkali and again heating under pressure until the reaction is complete, then releasing the pressure and allowing liberated ammoniacal and other gases to escape under vacuum and then neutralizing the excess caustic alkali.

AXEL LEONARD SODERGREEN.